United States Patent [19]

Schuster et al.

[11] 4,207,114
[45] * Jun. 10, 1980

[54] FOAMED CERAMIC ELEMENT AND PROCESS FOR MAKING SAME

[75] Inventors: Peter Schuster, Mannheim-Neu-Edingen; Bernd von Chiari, Rödental, both of Fed. Rep. of Germany

[73] Assignee: Schneider GmbH & Co., Frechen, Fed. Rep. of Germany

[ * ] Notice: The portion of the term of this patent subsequent to Oct. 31, 1995, has been disclaimed.

[21] Appl. No.: 910,028

[22] Filed: May 26, 1978

Related U.S. Application Data

[63] Continuation-in-part of Ser. No. 765,304, Feb. 3, 1977, Pat. No. 4,123,285.

[30] Foreign Application Priority Data

Feb. 7, 1976 [DE] Fed. Rep. of Germany ....... 2604793
May 27, 1977 [DE] Fed. Rep. of Germany ....... 2724010

[51] Int. Cl.² ............................................. C04B 21/02
[52] U.S. Cl. ............................ 106/40 R; 106/40 V;
106/63; 106/71; 106/73.6; 252/62; 264/43; 264/44
[58] Field of Search ............... 106/40 R, 40 V, 71, 106/73.6, 63; 264/43, 44

[56] References Cited

U.S. PATENT DOCUMENTS

| | | | |
|---|---|---|---|
| 3,030,222 | 4/1962 | Eichenlaub | 106/288 B |
| 3,051,589 | 8/1962 | Sanford et al. | 106/48 |
| 3,321,414 | 5/1967 | Vieli | 106/40 V |
| 3,666,506 | 5/1972 | Cowan et al. | 106/40 V |
| 3,801,343 | 4/1974 | Lemmens | 106/40 R |
| 4,071,369 | 1/1978 | Kurz et al. | 106/40 V |
| 4,112,033 | 9/1978 | Lingl | 106/73.6 |

FOREIGN PATENT DOCUMENTS

| | | |
|---|---|---|
| 2213231 | 9/1972 | Fed. Rep. of Germany ........ 106/40 V |
| 48-18086 | 6/1973 | Japan ........................................ 106/40 V |
| 244358 | 12/1925 | United Kingdom ...................... 106/51 |

OTHER PUBLICATIONS

Sziob, Z. et al., "Feasibility of Using Zebrydowa Clays and Electro Filter Dust from the turow Power Plant as well as Kaolin Residue for the Production of Wall Tiles"-Zeszyty Naukowe Akademii Gorniczo Hutniczej im. Stanislawa Staszica, No. 275; Ceramika, Z. 17, Krakow, (pp. 97-104), Mar. 1971.
Searle, A. B.-*Refractory Materials*-pub. Chas. Griffin & Co., London, (1950), pp. 72-75, 91-94, 97; pp. 140-146.
Mason, B. *Principles of Geochemistry,* 3rd Ed. pub. Wiley & Sons, NYC (1969), pp. 120-123, 126-129, 156-161.
Hackh's Chem. Dictionary-4th Ed.-pub. by McGraw-Hill, N.Y. (1969), p. 646, Sulfite; pp. 358-359, Iron.

*Primary Examiner*—Helen M. McCarthy
*Attorney, Agent, or Firm*—Wigman & Cohen

[57] ABSTRACT

A foamed ceramic product and method for making same is disclosed. The foamed ceramic is characterized by a high compressive strength, high insulating properties and low fluid permeability when compared against conventional materials. This foamed ceramic is made by mixing a clay mineral with a foaming agent comprising a combination of sulfate and sulfide compounds, heating to a temperature of about 1,000° C. where controlled foaming occurs and then cooling the resulting foamed product.

Additionally, there is disclosed a foamed ceramic product and method for making same which is characterized by its fire resistant properties as a result of creating micro cracks therein which permit controlled fluid permeability. This foamed ceramic product is made by controlling the phase constituents and heating and cooling temperatures to induce stresses which result in such micro cracks.

45 Claims, 2 Drawing Figures

FOAMED CERAMIC ELEMENT AND PROCESS FOR MAKING SAME

CROSS REFERENCE TO RELATED APPLICATIONS

This is a continuation-in-part application of our co-pending application Ser. No. 765,304 filed on Feb. 3, 1977 now U.S. Pat. No. 4,123,285.

BACKGROUND OF THE INVENTION

The invention relates generally to a ceramic light construction element and for a process for making same.

Ceramics of lightweight construction materials are known. Typically such materials can be produced by placing granulated material of approximately uniform size into a molding box where the granulated material is swelled. Thereafter highly heated gas is blown through the mass until a ceramically binding condition of the surfaces of the granulated parts is reached and until the swelling process is introduced. In such a process, the granulated parts are, as a rule, inflexibly supported to permit expansion into the free spaces where the particles are united to form a body of ceramically bound granulated parts.

However, in the known lightweight construction materials, the final product comprises a grainy structure, i.e., a structure where visible phase interfaces remain. Furthermore, the pore structure in the finished product is not homogeneous with respect to the size and distribution of the pores so that the lightweight construction material does not have isotropic properties, particularly with regard to thermal conductivity and strength. In addition, the known construction materials have a high water adsorptive capacity and the processes for making same are technologically complicated and expensive.

It has been attempted to swell suitable massive bodies, e.g., briquettes and continuous long pieces of clay-containing material, in a furnace. In this case, the swelled material separates from the unswelled material, falls onto the bottom of the furnace and is withdrawn from there. A homogeneous isotropic construction material with a low water absorptive capacity cannot be produced in this manner either.

In addition to the clay-mineral products, construction and insulating materials made of foamed glasses are known. In contrast to conventional clay-mineral insulation materials, foamed glass does not absorb water and has a diffusion resistance factor which is practically infinite. Such foamed glass products are made by mixing ground glass with a foaming agent and filling the admixture into steel molds. Foaming is induced in a tunnel kiln or compartment kiln and the foamed product is then cooled. As a rule, carbon or an organic compound decomposable to carbon at a temperature below the cell formation temperature are utilized as foaming agents. The foamed glass is practically free from crystals. However, an essential disadvantage of foamed glass lies in its low strength and its low compatibility with mortar. Additionally, when foamed glass porous structure is damaged there is evolved undesirable odors previously trapped in the closed pores.

Accordingly, there still remains a need for a lightweight ceramic material which has the desirable properties of both clay and glass insulating and light construction materials.

SUMMARY OF THE INVENTION

It is the primary object of this invention to provide a lightweight construction element which has the desirable insulating and lightweight features of the clay-material and foamed glass but, without its disadvantages. The object of this invention is carried out by providing a foamed ceramic element produced from mineral raw materials, preferably a clay-mineral having a crystal phase portion of more than about 10% by weight, preferably 15–30% by weight, a water absorption of practically zero and a diffusion resistance factor which is practically infinite.

The foamed ceramic body according to the present invention is characterized by the fact that it has relatively large spherical pores of almost the same size which are homogeneously distributed. Solid material surrounds the pores in a web-like manner and depending on the kind of the raw material used, contains about 10% by weight or more of a crystalline component (for example, anorthite), the remaining components of the solid material phase being X-ray amorphous. What is surprising is the fact that the webs of solid material are also porous and such pores have an average diameter which is much different than the relatively large pores surrounded by the webs. An analysis of the pore distribution is the foamed ceramic element according to the present invention yields two maxima which differ distinctly from each other and which result from the fact that the large pores are always surrounded by small pores, i.e., the webs between the large pores are filled with small pores. It has been observed that the ratio of the average diameter of the large pores (1st maximum) to the average diameter of the small pores (2nd maximum) ranges from about 3:1 to about 8:1. A preferred ratio is from about 4:1 to about 5:1. The gross density of the foamed ceramic element is generally between about 200 to about 1,000 kg/m$^3$ and preferably between about 400 to about 600 kg/m$^3$. The compressive strength of the foamed element in these gross density ranges is from about 4.0 to about 8.0 (or from about 2.5 to about 12 N/mm$^2$, respectively).

It is particularly advantageous that the relatively large pores in the foamed ceramic element are uniformly distributed and the deviation from the average pore diameter should not be more than ±50%. An especially suitable foamed ceramic element has relatively large pores with a diameter in the range of from about 1.5 to 2.5 mm in homogeneous distribution whereby gross densities between about 300 and 600 kg/m$^3$ are achieved. The foamed ceramic element according to the invention is to a large degree compatible with mortar and has a considerably higher fire resistance in comparison with conventional foamed glass. Furthermore, a shaped body of foamed ceramic according to this invention has a low thermal conductivity of between about 0.08 and 0.2 kcal/m °C. and thus a high thermal insulation value. It is resistant to humidity, fouling, and the effects of rodents and pests.

The process for the production of the foamed ceramic elements according to the present invention is characterized by the steps of (a) admixing a sulfate, a sulfide and water with the clay-mineral starting material which ordinarily cannot be swelled and which includes common fluxing agents and means for influencing the pore structure as necessary, drying the mixture, (b) then heating the clay-mineral admixture until foaming occurs, (c) subsequently cooling the foamed product. It was very surprising that, when clay-mineral is combined with a sulfate and a sulfide, the foaming process of the ordinarily non-swelling clay-mineral material can be controlled to such an extent that an isotropic ceramic foam body can be produced.

From the production of expanded clay, it is actually known that material which cannot ordinarily be swelled can be swelled by adding a swelling adjuvant or agent and fluxing agents. However, it is first necessary to provide relatively small granules, in comparison with a construction element, with a densely sintered outer skin, and, subsequently, to generate the gas from the swelling adjuvant so that the granules or grains can be swelled. As swelling adjuvants, gypsum or lignin sulfate are known. However, with these compounds and the known swelling adjuvants, gas evolution proceeds so fast after a certain temperature is reached that the foaming of large-format elements cannot be performed with the known swelling adjuvants. The same holds true for the use of sulfides.

It was unexpectedly discovered that when a mixture of sulfate and sulfide is used, gas evolution does not occur suddenly but rather gradually so that a temperature-dependent, adjustable and controllable foaming of clay-mineral-containing raw materials, which cannot ordinarily be swelled, becomes possible.

The swelling adjuvant according to the invention contains a mixture of a suitable sulfate and a sulfide at a ratio of about 10:1 to about 1:1, preferably about 3:1. The mixture is added to the foamable clay-mineral-containing raw material preferably in amounts of about 0.2 to 10%, by weight and preferably about 2 to 5% by weight, in relation to the solid phase.

A variety of suitable sulfate and sulfide compounds can be employed. A combination of iron sulfide and iron sulfate is particularly suitable but barium or calcium compounds can also be utilized. It is also possible to use sulfate and sulfide compounds with different cations in combination. Furthermore, compounds can be utilized which are partially or entirely soluble in water. It is essential that the sulfate can come into contact with the sulfide during the foaming process which can, for example, be achieved by an intimate mixing of the clay-mineral-containing raw materials with the foaming adjuvant.

The foaming adjuvants need not be pure compounds but can be a mixture of other products compatible with the clay-mineral-containing raw materials to be foamed. For example, sulfate or sulfide-containing products, particularly industrial or natural waste products, are usable. These can include slags, waste from the chemical industry, communal waste products, ash from combustion systems, dusts, filter ash or residues from processing. If only one of the sulfur compounds is contained in these products, it is supplemented by a product containing the other sulfur compound and/or by a pure other sulfur compound.

It is of special advantage when the sulfate and sulfide are arranged in such a manner that the two sulfur compounds are present as a mixture, especially in the grains of the foaming adjuvant, and said grains are desirably below 200 $\mu$m and preferably below 60 $\mu$m. In this case the homogenizing process can be restricted to the mixing of the clay-mineral-containing raw material with the foaming adjuvant.

In mixing the clay-mineral-containing raw materials with the foaming adjuvant it is also advantageous if, in addition to sulfate and sulfide, $SiO_2$, $Al_2O_3$, iron oxide and alkali oxide are also present. This particularly advantageous combination of the compounds is, as a rule, present in filtered sludge products, particularly in filtered sludge ash, so that such waste products are especially suitable for use as foaming adjuvant.

According to one of the processes of the present invention, foaming is preferably effected in an oxidizing atmosphere at a temperature between about 1,000° and 1,200° C. and for a time of between 10 and 180 minutes. It is possible to use raw materials with large foaming temperature intervals and to control the foaming process which is dependent on temperatures and time, in such a manner that foamed ceramic elements are produced with predetermined properties with regard to strength, porosity and thermal conductivity. This can be accomplished by, e.g., varying the sulfate/sulfide ratio and the quantity of foaming adjuvant. Clays, particularly stone clays, preferably with an illite portion, and loams are suitable clay-mineral starting materials. Fluxing agents can be added from the known alkali compounds. Such compounds can also be included with the foaming adjuvant.

Construction ceramic elements of any shape and size can be produced with the process according to the present invention to yield a higher strength in comparison with known products having the same porosity. At the same time, the ceramic element of the present invention has a lower thermal conductivity. This synergistic effect is probably due to the extraordinarily favorable influence on the structure of the foamed ceramic elements by the foaming adjuvant, i.e., the formation of two maxima of pore distribution. It is also possible to use this foaming adjuvant as a swelling adjuvant for the production of expanded granulated clay parts.

The light ceramic construction elements of the present invention have the described desirable properties and additionally can be made fireproof or fire resistant. Thus, another aspect of this invention is the further development to increase or to guarantee the fire resistance of foamed ceramic elements, and to teach a method by which the fire resistance of this type of structural bodies can be influenced as desired.

The fire resistance of structural bodies is prescribed by German Standard DIN 4102. In other countries the requirements may differ one degree or another. The present invention permits the construction of structural bodies which can generally be designated as fire resistant.

The known foamed glass and foamed ceramic elements are not considered fire resistant in use, as for example, in supporting walls, under DIN 4102. The reason for this lies especially in the brittleness, the number of gas-filled enclosed pores, the low heat conductivity and the relatively high coefficient of thermal expansion of such known glass and ceramic elements. Thus, when subjected to rapid heating, these elements can experience large cracks and flaking, causing the structural element to possibly disintegrate.

Theoretically there are many ways to obtain the fire resistance of structural elements. Firstly, one can attempt to decrease the coefficient of thermal expansion of the matrix. Secondly, the desired goal might be attained by increasing the elastic properties while reducing the glass phase in the foamed ceramic element. This can be effected, for example, by increasing the crystal phase portion. One might also attempt to increase the heat conductivity and the strength. However, attempts to change the heat conductivity and the coefficient of thermal expansion are not practical from an economic and technical procedure. Nor were other attempts to achieve the desired foamed ceramic elements successful.

Accordingly, it is a further object of the present invention to increase the fire resistance of foamed ceramic elements as aforementioned without giving up the other necessary properties of a structural body of this type.

This object is achieved by providing a foamed ceramic element according to the present invention, especially those using mineral raw materials as a basis, and possessing a pore distribution having two maxima, one maximum formed of pores of a large average diameter, and the other maximum formed by pores of a small diameter which are distributed in the solid web material between the large pores, and further including microscopic cracks within the meaning of this invention. "Microscopic cracks" as used in this invention are cracks which are caused by rapid heating and cooling, whereby the structural tensions which are caused by such temperature differences are relieved by the formation of cracks. In the foamed ceramic element according to the present invention, these microscopic cracks partially connect the large and small pores and thus produce a communicating or open porosity, which makes possible a diffusion of gas or even a partial gas flow. Another portion of the microscopic cracks is contained within the solid web.

Surprisingly, it has been shown that these microscopic cracks improve the resistance to temperature change as well as the gas diffusion and gas flow to such a degree that the necessary fire resistance can be assured. It is advantageous for the proportion of the microscopic cracks to be about 0.3 to 1.1% by volume. This results in an open porosity of about 10 to 25% by volume. It is especially advantageous for the open porosity to be about 15 to 20% by volume.

The microscopic cracks in the foamed ceramic element according to the invention correspond to the cracks described, for example, by Griffith. They may easily be analyzed by optical microscope.

According to a special embodiment of the invention, crystals and/or crystallites of anorthite and crystobalite are embedded in the solid web containing the glass phase. These crystals and/or crystallites are surrounded by microscopic cracks in positions basically parallel to the crystal surfaces, and/or from which microscopic cracks emanate more or less radially. In so doing, a crystobalite portion of from about 2 to about 20 is favorable, especially from about 5 to 15, and an anorthite portion of from about 2 to 30, especially from about 10 to 25% by weight. It is advantageous if the favorable open porosity lies between 10 and 25% by volume and the element has a diffusion resistance factor of from 60 to 160. The microscopic cracks should have a length of from about 10 to 30 $\mu$m, especially from 16 to 20 $\mu$m, and a width of from about 0.1 to 0.5 $\mu$m, especially 0.2 to 0.4 $\mu$m. Such microscopic cracks are firstly too small to form large cracks which could destroy the structural element, and secondly prevent the spreading of large cracks, because the large cracks will run into the numerous microscopic cracks and will thus terminate. Because the microscopic cracks presently communicate with each other as well as with the large pores, open flowable porosity is provided. The determination of open flowable porosity is possible in a simple manner by means of the water absorption test. This test is performed by boiling test cubes having dimensions of $10 \times 10 \times 10$ cm$^3$ according to the weight and volume determination in distilled water for two hours and then storing them for 24 hours in distilled water. The water absorption can be calculated from the determination of the wet weight of the cubes.

The water absorption of the foamed ceramic elements according to the present invention preferably lies in the range of from about 8 to about 30%, especially between 10 and 25%, by weight.

The production of the foamed ceramic elements according to the invention can take place in any manner desired. However, it is especially effective to produce tensions in the webs and then release the tensions by means of microscopic cracks. Accordingly, a further object of the invention is a method for producing fire resistant foamed ceramic elements, whereby at least one raw material, especially a clay-mineral-containing raw material, is mixed as necessary with common fluxing substances either dry or with water. The mixture is preferably granulated, dried, placed in forms, heated to foaming and finally cooled. The mixture includes a sulfate and a sulfide as a foaming adjuvant. During cooling, tensions are produced in the webs and the produced tensions are then relieved by the formation of microscopic cracks.

Mineral raw materials and the foaming processes, which lead to a foamed ceramic element, have already been described in our copending patent application Ser. No. 765,304, now U.S. Pat. No. 4,123,285, the subject matter of which is incorporated herein by reference. The admixing of the foaming adjuvant causes the foaming process to generate heat. It is therefore especially effective to provide temperature equalization by employing a sufficiently long period to achieve a constant temperature before swelling begins. Swelling is then carried out by the exothermic reaction between the reactants of the foaming adjuvant. In this manner, foamed ceramic elements can be produced with a swelling height of more than 50 cm while maintaining a uniform pore structure. The exothermic reaction in such a process is initiated by the use of filtered sludge ash as a foaming adjuvant, which contains sulfate and sulfide anions. The filtered sludge ash also has the effect of greatly reducing the melting point of the raw material because of its chemical composition, so that a synergistic effect results.

The exothermic reaction can also be produced using a raw material which has only one foaming adjuvant component to which a second foaming adjuvant component is added. For example, a non-foaming clay containing iron sulfate can be made capable of foaming merely by adding iron sulfide. Similarly, a clay containing sulfide can be rendered foamable by adding sulfate. It is also possible to use a swellable raw material which can be made capable of foaming by the addition of the required foaming adjuvant. The raw material can have a foaming adjuvant component as necessary, so that only the second component needs to be added. In all cases it is especially effective when the foaming process is started by an exothermic reaction.

The preparation of the raw materials may take place either dry or with water or a different component which makes the mixture easy to shape, and the granulated raw materials can be placed in the forms either wet or dry. The proper selection of these process parameters will depend on the requirements of the respective raw materials. Suitable foaming adjuvants include mixtures of pure sulfates and sulfides as well as natural and synthetic waste products which contain the sulfur compounds as components. If only one of the sulfur compounds is contained in such products, a foaming adjuvant can be produced therefrom by the admixing of a product containing the other sulfur compound.

According to an exemplary embodiment of the invention the tensions and microscopic cracks are produced by controlling the temperature during the cooling phase of the foamed product, wherein phase mixtures of at least two phases are formed in the webs. At the phase interfaces or regions, tensions are produced during cooling, whose force is determined by the difference of the coefficients of thermal expansion of the phases. The temperature is controlled during cooling in such a manner that the tensions are not equalized in the melted phase but are rather released by the formation of microscopic cracks at a certain component in the desired manner.

Preferably, a mixture of two phases is produced in the webs to assure that the mixture components or phases are nearly homogeneously distributed next to each other.

According to this invention the phase mixture is produced in an especially effective manner by means of devitrification crystals and/or crystallites are formed from the melt phase during cooling which have a higher coefficient of thermal expansion than the melt phase and the glass phase. The crystals or crystallites are embedded in the melt and glass phases of the web. During cooling substantial tensions are produced at the border surfaces between the glass and crystal phases, which are relieved by the formation of microscopic cracks both around the individual crystals and/or crystallites as well as emanating therefrom. Thus, one can control the number of the crystals and/or crystallites as well as their size as desired. In this maner, the intensity of the crack formation is regulated by controlling the temperature associated with nucleus formation and nucleus growth. The optimal conditions for a certain raw material composition can be empirically determined. The intensity of the crack formation increases as the size of the crystals or crystallites increases and as the cooling speed increases.

It is advantageous to prepare a raw material mixture which allows the formation of anorthite and cristobalite crystals. This is simplified by the use of stone clays, which, preferably have an illitic component, and filtered sludge ash as a foaming adjuvant. The crystobalite formation is favorably effected by the use of clays having a higher fine quartz component. The cooling procedure is selected so that from 2 to 20% cristobalite by weight and from 2 to 30% anorthite crystals by weight are produced in the webs. Thus, cooling is carried out to the transformation interval of the glass phase at from 2.0° to 5.0° C./min. and below the transformation interval at from 0.4° to 1.2° C./min. An especially favorable formation of the crystals and/or crystallites and an especially suitable embedding in the glass phase of the webs is obtained when the raw materials are prepared in a pug mill, because this results in an advantageous light, porous, raw mixture structure.

According to a further exemplary embodiment of the invention a phase mixture having differing coefficients of thermal expansion in the webs is produced by foaming and cooling a granulate material mixture of at least two types of granulate material homogeneously mixed, whereby each granulate material type forms a melt and glass phase, which has a different coefficient of thermal expansion than the other melt and glass phase. In this manner a granulate material mixture of two dry and/or moist raw granulate types or a mixture of two pre-swelled granulate types can be employed. It is also possible to homogeneously mix a raw granulate material type with a pre-swelled granulate material type. It is especially effective to mix a raw granulate type or a pre-swelled granulate material type with a foamed, ground, type of granulate material. Furthermore it is especially favorable to produce a raw granulate from raw materials, foaming adjuvants and ground, pre-swelled granulated material or ground foamed ceramic product according to the invention by means of intimate mixing. In this manner homogeneously distributed grains or nuclei are embedded in the granulated material formed from the other raw materials and the forming adjuvants. The latter two method variations are especially suitable if the pre-swelled or pre-foamed product possesses the larger coefficient of thermal expansion. In such cases foamed ceramic waste material, such as cutting waste, can be economically re-used, being preferably pre-ground to less than 8 mm and especially having the following grain distribution:

| 7.0–8.0 | mm | 11–14% | by weight especially | 12.83% | by weight |
|---|---|---|---|---|---|
| 3.0–7.0 | mm | 40–44 | by weight especially | 42.60 | by weight |
| 2.0–3.0 | mm | 9–12 | by weight especially | 10.87 | by weight |
| 1.0–2.0 | mm | 3–5 | by weight especially | 3.60 | by weight |
| 0.5–1.0 | mm | 8–10 | by weight especially | 8.47 | by weight |
| 0.25–0.5 | mm | 6–7 | by weight especially | 6.10 | by weight |
| 0.10–0.25 | mm | 7–8 | by weight especially | 7.20 | by weight |
| 0.063–0.1 | mm | 2–4 | by weight especially | 2.93 | by weight |
| <0.063 | mm | 4–6 | by weight especially | 5.40 | by weight |

It has been shown that for purposes of this invention it is advantageous if a granulate material type with a coefficient of thermal expansion after foaming in the range of from 4.2 to $5.0 \times 10^{-6}$ °C.$^{-1}$ is mixed with a granulate material type having a coefficient of thermal expansion after foaming in the range of from 5.0 to $7.0 \times 10^{-6}$ °C.$^{-1}$. One should primarily be aware that the difference of the coefficients of thermal expansion of the two types of granulate material or glass phase formants lies in the range between 0.5 to $2.5 \times 10^{-6}$ °C.[31 1], and especially between 0.8 to $2.0 \times 10^{-6}$ °C.$^{-1}$. The microscopic crack formation then takes place by the release of the tensions in the phase interface areas. It is especially favorable if the cooling takes place at from 2.0 to 5.0 °C./min. before the transformation interval and at from 0.4 to 2.0 °C./min. after said interval.

According to a further variation of the method according to this invention, it is especially recommended to form two glass phases and one or two crystal phases in the webs. This can be accomplished with a raw material composition of the variety of the first method by mixing with a second granulated material or foamed waste grain. This results in a glass phase with crystals being formed from the raw materials and a second glass phase from the waste grain. The crack formation is then especially easy to control, because the crystals and the glass phases produce tensions and promote the formation of the cracks.

It is furthermore advantageous to employ granulate mixtures which have different transformation ranges or a different transformation interval after the foaming. This facilitates the form, number and size of the cracks. The transformation interval should preferably have a difference of from 5° to 25° C.

Also, for this variation of method a partly wet preparation of the raw materials should be selected, especially with earth-moist clays, for use in the same mill, as should a heating speed to the foaming temperature of about 1180° to 1200° C. for from two to four hours.

One can produce a mass with a higher coefficient of thermal expansion in a simple manner by using the raw material matrix and adding ground quartz. The ground quartz should preferably have the following grain distribution:

| | | | | | |
|---|---|---|---|---|---|
| >63 μm | 18–20% | by weight especially | 19% | by weight |
| 50–63 μm | 7–9 | by weight especially | 8 | by weight |
| 40–50 μm | 6–8 | by weight especially | 7 | by weight |
| 25–40 μm | 18–22 | by weight especially | 20 | by weight |
| 16–25 μm | 14–16 | by weight especially | 15 | by weight |
| 10–16 μm | 10–12 | by weight especially | 11 | by weight |
| 6.3–10 μm | 6–8 | by weight especially | 7 | by weight |
| 4–6.3 μm | 3–5 | by weight especially | 4 | by weight |
| 2.5–4 μm | 2–5 | by weight especially | 4 | by weight |
| <2.5 μm | 3–5 | by weight especially | 5 | by weight |

In addition the raw material matrix can be replaced to produce the second type of granulated material by a fine quartz-rich clay, for example, with the following grain distributions:

| | | | | | |
|---|---|---|---|---|---|
| >63 μm | 1–2% | by weight especially | 1.6% | by weight |
| 50–63 μm | 1–2 | by weight especially | 1.3 | by weight |
| 40–50 μm | 1–2 | by weight especially | 1.4 | by weight |
| 25–40 μm | 2–4 | by weight especially | 2.7 | by weight |
| 16–25 μm | 3–6 | by weight especially | 5.4 | by weight |
| 10–16 μm | 2–4 | by weight especially | 3.8 | by weight |
| 6.3–10 μm | 8–10 | by weight especially | 9.2 | by weight |
| 4–6.3 μm | 3–6 | by weight especially | 5.1 | by weight |
| 2.5–4 μm | 4–7 | by weight especially | 6.2 | by weight |
| <2.5 μm | 60–66 | by weight especially | 63.3 | by weight |

DESCRIPTION OF PREFERRED EMBODIMENTS

Figure 1:
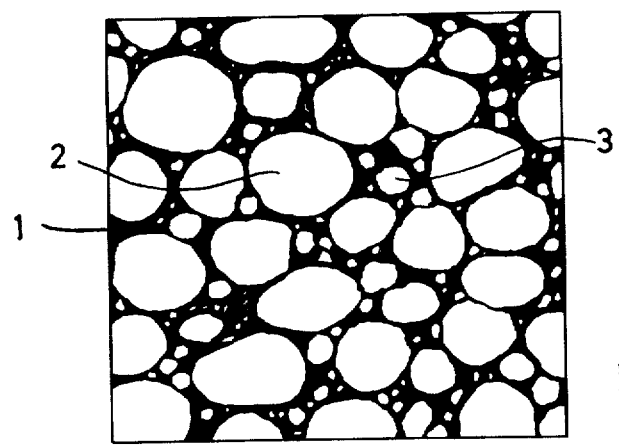
FIG. 1 illustrates the structure of the foamed ceramic element made in accordance with the present invention (e.g., see Example 2, infra). More particularly, the pore distribution of the element consists of the web material 1, the relatively large pores 2 and the relatively small pores 3. The ratio of the average pore diameter of the large pores to the average pore diameter of the small pores in the web material is, in this instance, about 4.5 to 1.
Figure 2:
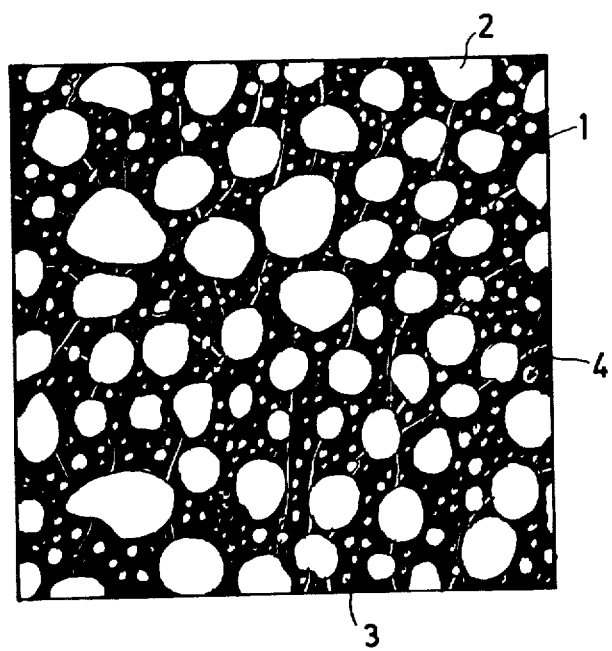
FIG. 2 illustrates the structure of the fire resistant foamed ceramic element made in accordance with another aspect of this invention in this embodiment. The web material 1 surrounds the layer pores 2. The smaller pores 3 and the microscopic cracks 4 are homogeneously distributed in the webs 1. Part of the microscopic cracks proceed from one large pore 2 to another large pore 2 or from small pore 3 in the web to another small pore 3, without reaching the large pore 2. Cross cracks are also present. By means of the connection between the large and small pores, the cracks cause the open flowable porosity for the diffusion of gases.

Having described the invention in general terms, the following examples are set forth to more particularly illustrate the invention. These examples, however, are not meant to be limiting. All percentages are by weight.

EXAMPLE 1

A mixture of 70% stone clay, 20% ground basalt, 3% iron sulfide and 7% iron sulfate was prepared. Two parts by weight of water were added to one part by weight of the preparation and the mixture was intimately mixed in the ball mill for 4 hours. Subsequently, the mixture was poured into cups. This was followed by drying to a residual water content of below 2% water. The dried substance was then crushed and put into a mold 20×20×15 cm, 8 cm high and placed in a furnace and heated to 1,160° C. at 2° C./minute. The substance foamed uniformly in the temperature range of 1,140° to 1,170° C. After cooling, a foamed ceramic plate was obtained having a density of 500 kg/m$^3$, a compressive strength of 8 N/mm$^2$ and a thermal conductivity of 0.1 kcal/m h °C. The average pore diameter of the relatively large pores amounted to 2 mm.

EXAMPLE 2

The preparation consisted of 50% stone clay and 50% of a filtered sludge ash product of a composition similar to a clay substance. This preparation contained 0.9% S$^{-2}$ and 2.5% SO$_4^{-2}$. The processing and the foaming were effected according to Example 1. This resulted in a foamed ceramic plate having a density of 400 kg/m$^3$, a bending strength of 3 N/mm$^2$ and compressive strength of 7 N/mm$^2$. The gas permeability of the plate amounted to 10 nanoperms and its thermal conductivity was 0.1 kcal/m h °C. The average pore diameter of the relatively large pores amounted to 2 mm.

EXAMPLE 3

In accordance with Example 1, a mixture was made comprising 50% loam, 10% ground basalt and 40% of a filtered sludge ash product with the composition according to Example 2. The mixture was heated to 1,150° C. and the resulting foamed product then cooled. A foamed ceramic plate was obtained with a density of 400 kg/m$^3$ and with the same properties as indicated in Example 2 with regard to bending strength, compressive strength, gas permeability, thermal conductivity, as well as pore distribution.

EXAMPLE 4

A mixture of 70% stone clay, containing at least 50% of fine quartz, 20% ground basalt, 3% iron sulfide and 7% iron sulfate was prepared. One part of this mixture was added to 0.25 parts water and the components were then intimately mixed for 20 minutes in a mixing sand mill. The mixture was subsequently dried until a residual water content of less than 2% by weight was reached. The dried material was then ground to granules having a maximum grain size of about 10 mm and the granules placed in mold forms and foamed. The foaming process was carried out in fire resistant forms having an insulating layer for about 10 hours or more to a final temperature of 1180° C. The material foamed uniformly in the temperature range of from 1140° to 1180° C.

While the cooling process takes about three hours to cool the material to 780° C., 24 hours are necessary for cooling to room temperature.

After the cooling is completed a foamed ceramic element is obtained which has anorthite and crystobalite crystals in the solid webs and the following characteristics: density of 500 kg/m$^3$, compressive strength of 5.5 N/mm$^2$, bending strength of 2.5 N/mm$^2$, and thermal conductivity of 0.1 Kcal/m·h·°C. The average pore diameter of the larger pores was 2.5 mm and the water absorption was 15% by weight.

EXAMPLE 5

The mixture is composed of 50% clay or a clay mixture which contains at least 50% fine quartz, and 50% filtered sludge ash product of a composition similar to a clayey substance. It contains 0.9% $S^{-2}$ and 2.6% $SO_4^{-2}$. The preparation and the foaming take place in the same basic order as Example 4, except that the granules are in a plastic condition by means of a pelleting device. The granules are placed in the insulated fire resistant pans in a plastic condition either after drying or directly. After the foaming and cooling processes are completed a foamed ceramic fire resistant element is obtained which has a density of 450 kg/m$^3$ and a compressive strength of 5.0 N/mm$^2$. The bending strength is 2.5 N/mm$^2$ and the thermal conductivity is 0.1 Kcal/m·h·°C.

These fire resistant elements have a water absorption value of about 14% by weight.

EXAMPLE 6

Pellets according to Examples 4 and 5 are made from a mixture of a normal illitic stone clay and a clay containing a large quantity of quartz. These pellets are mixed together after drying, in a weight ratio of 2:1, placed in a fire resistant pan, heated, foamed and cooled according to Example 3.

After cooling, the resulting foamed ceramic element has a density of 450 kg/m$^3$, a compressive strength of 5.5 N/mm$^2$ and a bending strength of 2.8 N/mm$^2$. The thermal conductivity is about 0.15 kcal/m·h·°C., and the water absorption value is about 15% by weight. The average pore diameter of the large pores is 2.5 mm.

From the foregoing it will be apparent that the present invention teaches a method of making fire resistant foamed ceramic elements through the controlled formation of microscopic cracks therein and the resulting article. It is also possible to obtain fire resisting properties in conventional foamed glass and other foamed ceramic elements through the formation of microscopic cracks using the teachings of this invention.

Therefore it should be appreciated that the present invention is not to be construed as being limited by the illustrative embodiments. It is possible to produce still other embodiments without departing from the inventive concept herein disclosed. Such embodiments are within the ability of one skilled in the art.

We claim:

1. Foamed ceramic element formed from clay-mineral raw materials comprising a body portion which includes a pore distribution having two maxima, the first maximum is formed by the average diameter of large pores, the second maximum is formed by the average diameter of the smaller pores, said smaller pores permeate the solid web between the large pores, said solid web further including microscopic cracks which partially interconnect the large and small pores thereby providing an open porosity, said foamed ceramic element having improved fire resistant characteristics and a water absorption characteristic of from about 10% to about 25%.

2. The foamed ceramic element according to claim 1, wherein the proportion of the microscopic cracks is from 0.3 to 1.1% by volume which results in an open porosity of from 10 to 25% by volume.

3. The foamed ceramic element according to claim 1, wherein said solid web includes embedded crystals and/or crystallites of anorthite and crystobalite which are surrounded by microscopic cracks.

4. The foamed ceramic element according to claim 3, wherein the crystobalite component comprises from about 2 to about 20%, and the anorthite component comprises from about 2 to about 30% by weight.

5. The foamed ceramic element according to claim 3, wherein the crystobalite component comprises from about 5% to about 15%, and the anorthite component comprises from about 10% to about 25%, by weight.

6. The foamed ceramic element according to claim 1, characterized by a diffusion resistance factor of from 60 to 160.

7. The foamed ceramic element according to claim 1, wherein said microscopic cracks are from about 10 to about 30 μm long, and from about 0.1 to about 0.5 μm wide.

8. The foamed ceramic element according to claim 1, wherein said microscopic cracks are from about 16 μm to about 20 μm long and from about 0.2 μm to about 0.4 μm wide.

9. The foamed ceramic element according to claim 1, wherein said microscopic cracks are partially in communication with each other and partially extend to the large and/or small pores.

10. Method for the production of a foamed ceramic element according to claim 1 comprising the steps of: admixing at least one raw material, including a clay-mineral-containing raw material with a foaming adjuvant of sulfate and sulfide in a ratio of sulfate: sulfide of between about 10:1 to 1:1; drying said mixture; placing said dried mixture in mold forms; heating said mixture to foaming; and cooling under conditions which produce tensions in the webs which are then dissipated by the formation of microscopic cracks.

11. The method according to claim 10, wherein said foaming is performed with the assistance of an exothermic reaction of the foaming adjuvant.

12. The method according to claim 11, including the step of equalizing the temperature before swelling by means of a period of constant temperature.

13. The method according to claim 10, wherein said raw material includes one of the foaming adjuvant components, further including the step of admixing a second foaming adjuvant component thereto.

14. The method according to claim 10, wherein said raw material is swellable.

15. The method according to claim 10, wherein the microscopic cracks are produced by controlling the temperature during the cooling of the foamed product, said web including at least two phases having different coefficients of thermal expansion.

16. The method according to claim 15, wherein the mixture of two phases produced in the web are substantially homogeneously distributed.

17. The method according to claim 16, wherein the phase mixture is produced by crystalization from the melt phase during cooling, whereby the formed crystals and/or crystallites have a higher coefficient of thermal expansion than said melt phase.

18. The method according to claim 17, wherein anorthite and crystobalite crystals are produced.

19. The method according to claim 18, wherein said raw material is a stone clay with an illite component.

20. The method according to claim 19, wherein the cooling step is carried out at a rate of 2.0° to 5.0° C./min. until the phase transformation interval is reached, and below the transformation interval cooling proceeds at the rate of from 0.4° to 1.2° C./min.

21. The method according to claim 18, wherein the raw materials are prepared with a sand mill.

22. The method according to claim 15, wherein a homogeneous granulate mixture of at least two types of granulate material are foamed and cooled, each type of granulate material forming a melt and glass phase which has a different coefficient of thermal expansion from the other glass phase.

23. The method according to claim 22, wherein a raw granule type is mixed with a pre-swelled type of granulate.

24. The method according to claim 22, wherein a raw granulate material or pre-swelled type of granulate material is mixed with a foamed, ground type of granulate material.

25. The method according to claim 22, wherein a raw granulate material is produced out of raw materials, foaming adjuvants and ground, foamed ceramic product, by intimate mixing, whereby the grain for the second phase is homogeneously distributed and embedded in the granulate material.

26. The method according to claim 25, wherein the pre-foamed granulate material possesses a greater coefficient of thermal expansion than said melt phase.

27. The method according to claim 22, wherein one type of granulate material has a coefficient of thermal expansion after foaming in the range of from about 4.2 to $5.0 \times 10^{-6}$ °C.$^{-1}$ is mixed with another type of granulate material having a coefficient of thermal expansion after foaming in the range of from about 5.0 to $7.0 \times 10^{-6}$ °C.$^{-1}$.

28. The method according to claim 27, wherein the cooling step is carried out at the rate of from 2.0° to 5.0° C./min. before the phase transformation interval is reached, and from 0.4° to 1.2° C./min. after the transformation interval is reached.

29. The method according to claim 10, wherein said web includes two glass phases and at least one crystal phase.

30. The method according to claim 15, wherein a granulate material mixture of at least two types of granulate material is used, whose glass phases have different transformation ranges.

31. The method according to claim 30, wherein the difference of the transformation intervals is from 5° to 25° C.

32. The method according to claim 30, wherein a granulate of the raw material matrix which includes ground quartz, is used to produce the glass phase with a higher coefficient of thermal expansion.

33. The method according to claim 30, wherein a granulate of the raw material matrix includes clay rich in fine quartz, is used to produce the glass phase with a higher coefficient of thermal expansion.

34. Process for the production of a foamed ceramic element from mineral raw materials not ordinarily capable of being swelled, including clay-mineral-containing raw materials, with or without fluxing agents, comprising the steps of admixing said mineral raw material with a sulfate and sulfide foaming adjuvant and water, drying the mixture to be foamed and then placing the dried mixture into molds prior to foaming, heating the mixture at about 1000° C. or more until foaming occurs, and subsequently cooling the foamed ceramic, and said foaming adjuvant is added in a ratio of sulfate:sulfide of between about 10:1 to 1:1.

35. The process according to claim 34, wherein the foaming adjuvant of sulfate and sulfide is added in a ratio of sulfate:sulfide of 3:1.

36. The process according to claim 34, including the steps of adding the foaming adjuvants in relation to the solid substance in an amount ranging from about 0.2 to 10%, preferably 2 to 5% by weight.

37. The process according to claim 34, including the step of employing a combination of iron sulfate and iron sulfide as the foaming adjuvant.

38. The process according to claim 34, characterized by the fact that the foaming adjuvant added is at least partially soluble in water.

39. The process according to claim 34, characterized by the fact foaming adjuvant added is a composition which contains at least one of the sulfur compounds.

40. The process according to claim 39, wherein said foaming adjuvant comprises natural and industrial waste products.

41. The process according to claim 40, wherein said foaming adjuvant comprises particles below about 200 μm.

42. The process according to claim 34, wherein the foaming step is effected at between about 1,000° to 1,200° C.

43. The process according to claim 42, wherein the foaming step is carried out between about 10 to 180 minutes.

44. The process according to claim 34, wherein the starting material employed is stone clay including an illite portion.

45. A foamed ceramic element of lightweight construction made in accordance with the process of claim 34 characterized as having a crystalline phase of at least about 10 percent by weight, a water absorption characteristic nearly zero, a diffusion resistance factor which is practically infinite, a thermal conductivity of between about 0.08 to about 0.2 kcal/m·h·°C.

* * * * *